2,946,805
Patented July 26, 1960

2,946,805
SYNTHESIS OF 2-PYRROLIDONE

Roger F. Kleinschmidt, Bartlesville, Okla., and Joseph M. Wilkinson, Easton, Pa., assignors to General Aniline & Film Corporation, New York, N.Y., a corporation of Delaware No Drawing. Filed May 20, 1957, Ser. No. 660,081

4 Claims. (Cl. 260—326.5)

The invention here presented is a new process for the preparation of pyrrolidone from gamma-hydroxybutyramide for use in the further preparation of vinylpyrrolidone and of polyvinylpyrrolidone.

Polyvinylpyrrolidone is one of the more important synthetic polymers, for which there is a wide range of uses and a very substantial commercial demand, not the least of its various uses being that of a blood plasma extender for treatment of shock, hemorrhage and the like. In the past this substance has been produced by a rather complicated sequence of chemical process steps, with the necessity of elaborate purification between the successive steps, and the use of much expensive equipment; many of the process steps and purifications being chemically unsatisfactory, uncertain and expensive.

According to the present invention, gamma-hydroxybutyramide is heated in the presence of anhydrous ammonia whereupon by loss of a molecule of water from each molecule of gamma-hydroxybutyramide 2-pyrrolidone is obtained; the latter is readily converted by well known processes into vinylpyrrolidone and then into polyvinylpyrrolidone. The process of the present invention is particularly advantageous because of the high yield and purity of the product.

Thus the reaction of the invention produces a high yield of 2-pyrrolidone without the production of troublesome by-products or impurities.

The reaction of the present invention proceeds according to the following equation:

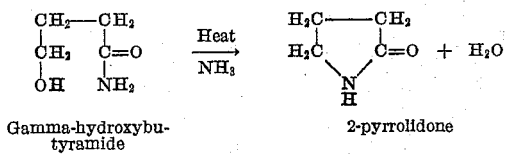

Gamma-hydroxybu-        2-pyrrolidone
tyramide

The reaction is conducted in the presence of a substantial pressure of anhydrous ammonia and preferably at a substantially elevated temperature.

Other objects and details of the invention will be apparent from the following description.

The primary raw material is gamma-hydroxybutyramide which is obtainable in conditions of good purity. An appropriate amount of this material is charged into an autoclave having means for heating it to a temperature within the range of 200 and 300° C.

The second component of the invention is a supply of anhydrous ammonia, conveniently obtainable from a cylinder of liquefied ammonia which is connected to the same autoclave.

In practicing the invention, the autoclave is first charged with an appropriate amount of the gamma-hydroxybutyramide which may fill the major portion of the autoclave, since the reaction does not significantly increase the bulk of material. The autoclave is then closed and anhydrous ammonia then passed in until a gauge pressure of 500 to 600 pounds per square inch is obtained. The autoclave is then heated to a temperature within the range between 200 and 300° C., the precise temperature not being important, but the preferred temperature being approximately 250° C. The reaction proceeds rapidly and is complete in a relatively short time, which may be from a few minutes to a few hours, depending upon the size of the charge. When the reaction is substantially complete, the reactor may be cooled, any residual ammonia vented and the finished, cool 2-pyrrolidone discharged. The pyrrolidone may be subject to purification steps if the utmost purity is desired, but this is usually entirely unnecessary and the product, as discharged from the pressure reactor, is as a rule sufficiently pure for the next step.

This material may then be converted to vinylpyrrolidone by well known processes, and the vinylpyrrolidone may be polymerized by other well known process as desired, as is well shown in U.S. 2,265,450, 2,335,454, 2,634,259, or 2,665,271. The resulting polymer may be produced in any desired molecular weight according to the character of the polymerization reaction. As so obtained, the polymer is sufficiently pure for most uses. If however, the utmost in purity is desired it is readily purified by a simple precipitation reaction as the hydrate by such precipitants as ether and the like.

The following examples are offered as the best presently known procedure for practicing the invention but they are not intended to impose any limitations upon the claims solicited.

Example 1

A pressure reactor was prepared by inserting thereinto an appropriate amount of commercial gamma-hydroxybutyramide, whereupon the reactor was closed and pressured with anhydrous ammonia until a pressure within the range between 500 and 600 pounds was obtained. The reactor was then heated to about 250° C. preferably with stirring for approximately 4 hours. At the end of this time the ammonia pressure was released, the material cooled and the autoclave discharged.

It may be noted that the charge in the reactor may be so adjusted that approximately 412 parts of the gamma-hydroxybutyramide by weight, and 23 parts by weight of the anhydrous ammonia may be caused to yield the desired pressure. This procedure will yield approximately 393 parts (that is, 86% of theory) of 2-pyrrolidone, and with it there is produced a water-soluble substance in the amount of 33 parts. No trace of gamma-butyrolactone was found.

Example 2

The reaction was conducted as in Example 1, and at the end of the reaction the material from the autoclave was distilled, to separate the 2-pyrrolidone from the contaminants to yield a material of outstanding purity.

Thus the present invention provides a new and efficient process for the production of polyvinylpyrrolidone by a very simple, easily conducted sequence of process steps to produce a very pure polyvinylpyrrolidone.

While there are above disclosed but a limited number of embodiments of the process of the invention it is possible to provide still other embodiments without departing from the inventive concept herein disclosed, and it is therefore desired that only such limitations be imposed upon the appended claims as are stated therein or required by the prior art.

The invention claimed is:

1. A process for the preparation of 2-pyrrolidone which comprises reacting gamma-hydroxybutyramide with anhydrous ammonia at elevated temperatures and pressures, and recovering the thus produced 2-pyrrolidone.

2. A process as defined in claim 1 wherein the reaction is performed at between about 200 and 300° C.

3. A process as defined in claim 1, wherein the reaction is performed under a pressure of about 500 pounds p.s.i. gauge.

4. A process as defined in claim 1 wherein the reaction is performed at between about 200 and 300° C. and under a pressure of about 500 pounds p.s.i. gauge.

References Cited in the file of this patent

UNITED STATES PATENTS

| | | |
|---|---|---|
| 2,182,178 | Pinkernelle | Dec. 5, 1939 |
| 2,784,191 | Fischer et al. | Mar. 5, 1957 |
| 2,817,646 | Payne | Dec. 24, 1957 |